United States Patent [19]

Boblitz

[11] 4,172,442

[45] Oct. 30, 1979

[54] SOLAR ENERGY COLLECTOR SYSTEM AND METHOD

[75] Inventor: Oliver W. Boblitz, Basye, Va.

[73] Assignee: Bio Gas Systems, Inc., Washington, D.C.

[21] Appl. No.: 905,581

[22] Filed: May 15, 1978

[51] Int. Cl.² .......................... F25B 29/00; F24J 3/02
[52] U.S. Cl. ...................... 126/422; 126/438; 126/419; 126/400; 165/18; 237/1 A; 126/424; 126/435; 126/437; 126/450; 126/452
[58] Field of Search ............ 126/271, 270, 400; 237/1 A; 165/18

[56] References Cited

U.S. PATENT DOCUMENTS

| | | | |
|---|---|---|---|
| 3,250,269 | 5/1966 | Sherock | 126/271 |
| 3,957,109 | 5/1976 | Worthington | 237/1 A |
| 4,044,752 | 8/1977 | Barak | 126/270 |
| 4,068,652 | 1/1978 | Worthington | 126/270 |
| 4,085,731 | 4/1978 | Weir | 126/271 |
| 4,110,172 | 8/1978 | Spears | 126/271 |
| 4,128,096 | 12/1978 | Katz | 237/1 A |
| 4,129,177 | 12/1978 | Adcock | 126/271 |

Primary Examiner—Samuel Scott
Assistant Examiner—Daniel J. O'Connor
Attorney, Agent, or Firm—Carroll F. Palmer

[57] ABSTRACT

A solar energy collector system having high energy collection efficiency simultaneously heats separate gas and liquid streams flowing through the collector. The gas flows in a tiered passage sunward of the liquid passage. Exposure times of gas and liquid are regulated by separate thermostatic controls. The heated gas and liquid may be used as energy imput for space heating, hot water, air conditioning, etc., separately or in combination.

12 Claims, 4 Drawing Figures

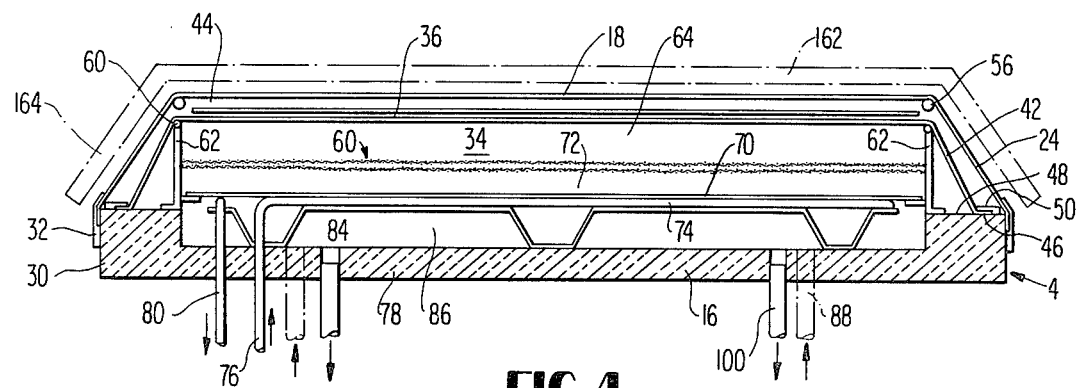
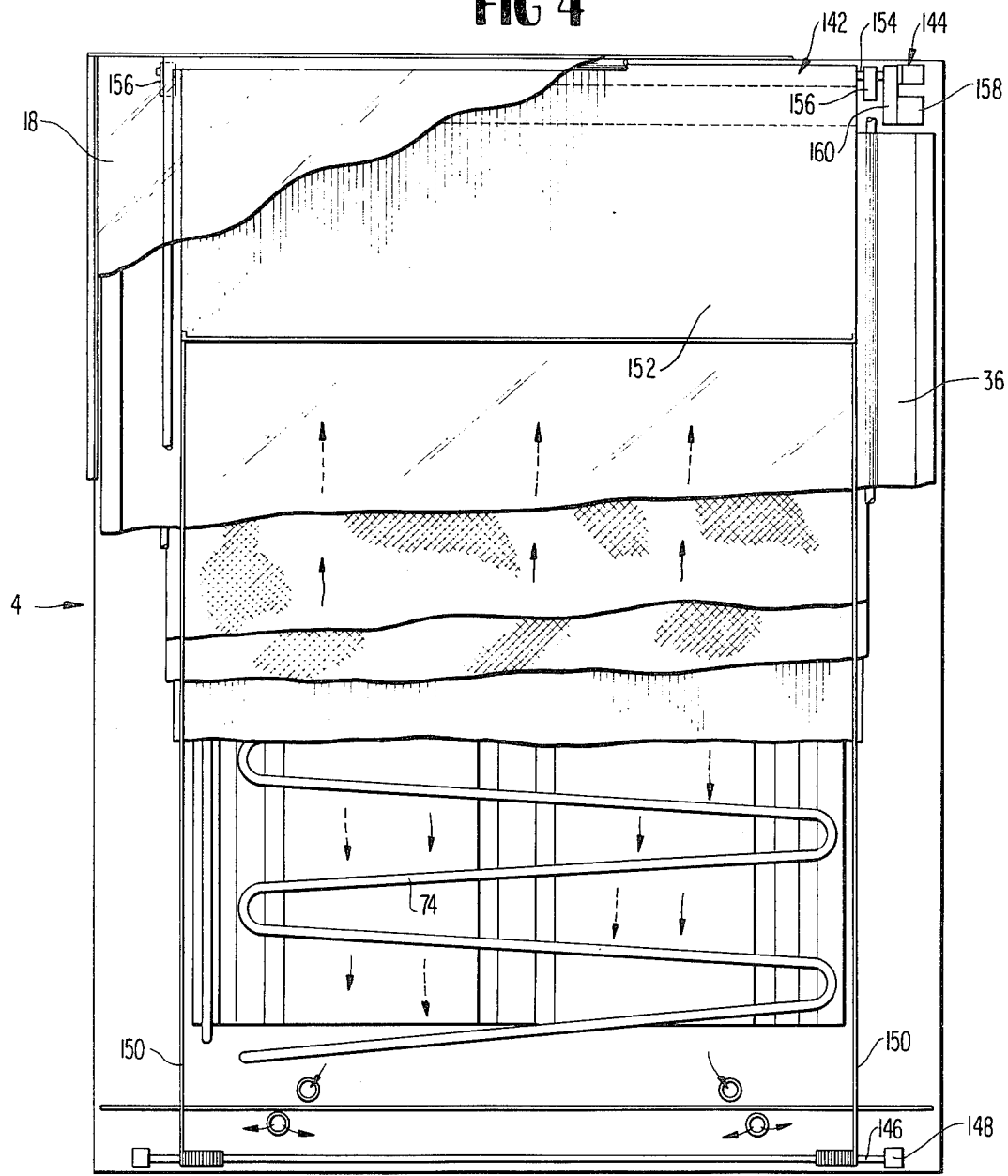

4,172,442

SOLAR ENERGY COLLECTOR SYSTEM AND METHOD

BACKGROUND OF THE INVENTION

1. Field of the Invention

This invention relates to systems and methods for utilization of solar energy. More particularly, it concerns improvements in collection efficiency of solar energy collection systems by heating gas and liquid streams in controlled manner at the same time.

2. Description of the Prior Art

A great amount of study and work has been devoted in the past to solar energy utilization and, as the cost of fossil fuel has increased, the pace of such study and work has increased. Nevertheless, the relatively high cost of solar energy equipment per energy unit usefully delivered has been a serious deterrent to its widescale use. Equipment costs and improvement in its collection efficiency would serve to increase demand for and use of solar energy systems.

The present inventor has previously patented a solar energy system using improved solar heat collectors to supply reaction heat in conducting continuous chemical processes, e.g., manufacture of methane gas (see U.S. Pat. No 4,057,401).

Solar collectors have, of course, been used to heat gas alone (see U.S. Pat. No. 4,016,860) or liquid alone (see U.S. Pat. No. 4,082,081). Also, there are numerous solar heaters that use heated air for heat exchange with liquid to provide heated liquid or, the reverse, heated liquid to provide heated air (see U.S. Pat. Nos. 3,250,269; 3,875,925; 3,919,998 and 3,960,136).

Notwithstanding the extensive research and development directed to solar energy collection, there exists a continuing need for improvements in efficiency of such operation and reduction in the cost of equipment used therewith.

OBJECTS

A principal object of this invention is the provision of new systems and methods for solar energy collection.

Another object is the provision of improvements in solar energy collection to obtain high energy collection efficiency and reduce the cost per unit of energy rendered usefully available in such collection operations.

A further object is the provision of a solar energy collector that heats gas and liquid at the same time and increases the BTUs obtained per square foot of collecting area.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

SUMMARY OF THE INVENTION

The objects of the invention are accomplished by constructing a solar energy collector system to enable sun rays radiated upon the collector to simultaneously heat separate gas and liquid streams pumped through the collector and to regulate exposure times of the gas and liquid within the collector automatically by separate thermostatic controls. A gas passageway is provided sunward of the liquid passage which is in direct heat exchange with an opaque panel of heat conductive material positioned in the gas-tight chamber of the collector defined by a insulated housing and a pair of spaced apart covers formed of transparent material. The gas passageway is located below the two covers and is tiered by central screen means that intercepts a portion of the sun rays entering the collector while allowing the remaining rays to heat the opaque panel on the shadow side of the screen means. Shutter means is provided to move between the first and second transparent covers to shade the screen means, passageways and panel from sunrays radiating on the collector and there is means automatically to operate the shutter means dependent upon the temperature existing in the collector chamber.

BRIEF DESCRIPTION OF THE DRAWINGS

A more complete understanding of the invention may be had by reference to the accompanying drawings in which:

FIG. 3 is a sectional view taken on the line 3—3 of FIG. 2.

FIG. 4 is fragmentary plan view of the solar heat collector of FIG. 2.

DESCRIPTION OF PREFERRED EMBODIMENTS

Figure 1:
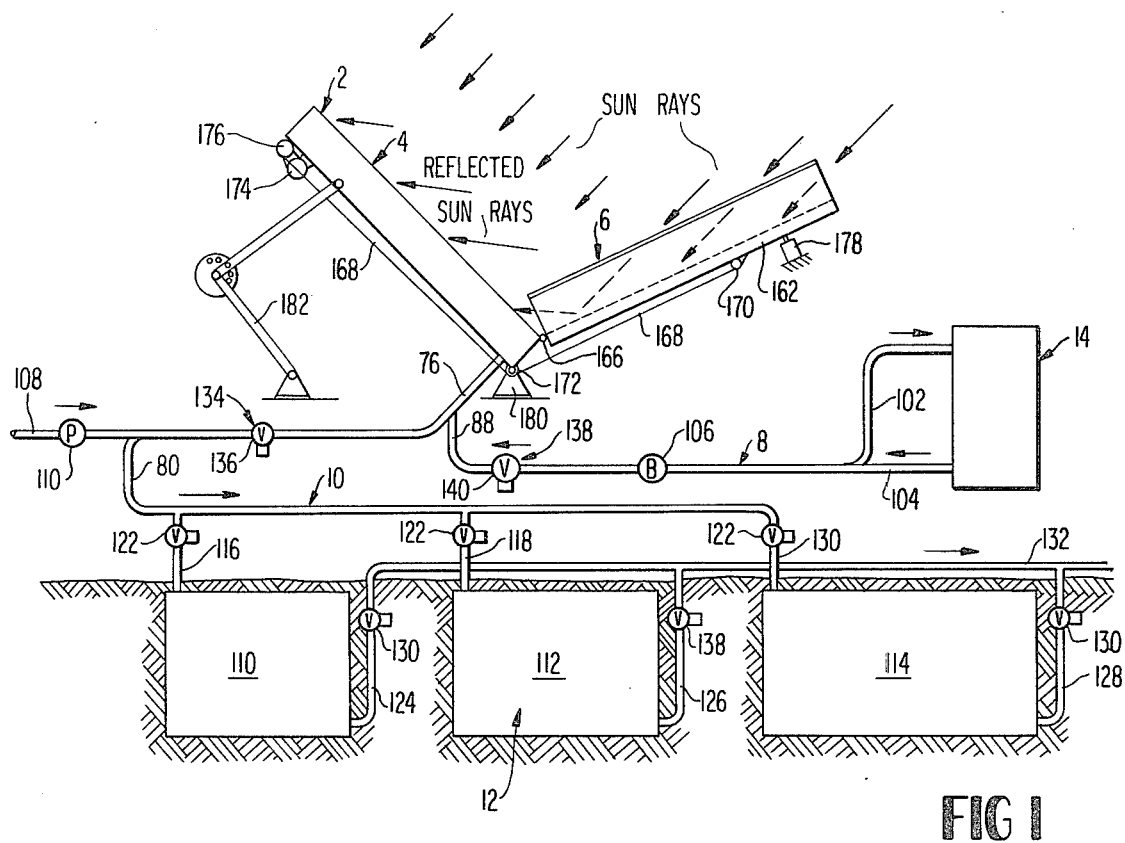
FIG. 1 is diagrammatic lateral view of a solar heat collector system of the invention.

Referring in detail to the drawings, the collector system 2 basically comprises collector means 4, reflector means 6, gas conduit means 8, liquid conduit means 10, liquid storage means 12 and external heat exchange means 14.

The collector means 4 comprises a quadrangular housing 16 formed of heat insulation material and a first transparent cover 18 having a flat surface portion 20, dependent end portions 22 and dependent side portions 24. The end portions 22 are sealed to the ends 26 of housing 16 by the contoured strips 28 fixed to the ends 26 by fasteners (not shown). Similarly, side portions 24 are sealed to the sides 30 of housing 16 by contoured strips 32 fixed to the sides 30 by fasteners (not shown). Accordingly, the cover 18 forms an air-tight chamber 34 over the housing 16.

A second transparent cover 36 having a flat surface portion 38, dependent end portions 40 and dependent side portions 42 is positioned within chamber 34 with portion 38 spaced apart and substantially parallel to portion 20 of cover 18 providing therebetween a space 44. The angled tip 46 of portion 42 is held upon the ledge portion 48 of housing 16 by contoured strip 50 while the angled tip 52 of portion 40 rests on ledge portion 54 of housing 16.

A rod or wire frame 56 provides support and rigidity to the cover 18 and, likewise the frame 58 strengthens the cover 36.

Screen means 60 is stretched substantially parallel to the cover 36 across the chamber 34 between the angle members 62 forming a gas passageway 64 between cover 36 and screen means 60.

The screen means 60 intercepts a portion of the sun rays passing through covers 18 and 36 causing the passageway 64 to be heated. It may be formed, for example, of a single layer of woven metal screening. Advantageously, however, the means 60 is made of two layers 66 and 68 of metal screening with the surface of layer 68 opposite the cover 36 being light reflective and the other three surfaces of layers 66 and 68 being light absorptive. This can be attained by making layers 66 and 68 of woven aluminum screen with the top and bottom surfaces of layer 66 and top surface of layer 68 being coated with light absorptive material, e.g., matt-finish black paint while leaving the bottom surface of layer 68 uncoated.

An opaque panel 70 is positioned within the chamber 34 substantially parallel to the screen means 60 and spaced apart therefrom forming a longitudinal passageway 72 between means 60 and panel 70. The panel may be formed of any heat conductive material, e.g., aluminum, copper or steel sheet or plate.

Tubing 74 is positioned in direct heat-exchange contact with the panel 70, e.g., by welding the tubing to the panel. The tubing can be of any desired cross-section, e.g., circular, square, elliptical, etc. and formed of any suitable heat-conductive material, e.g., copper, aluminum etc. Alternatively, the combination of panel 70 and tubing 74 may be replaced with a pair of metal plates stamped and welded together to form a liquid conduit equivalent to the tubing 74.

The tubing 74 is contiguous with a liquid inlet 76 that enters into the chamber 34 through the base 78 of the housing 16 and a liquid outlet 80 that exits through the housing base 78. A pressure relief valve 82 may be included in the tubing line 74 to prevent the pressure in the line from exceeding a predetermined maximum.

A corrugated sheet 84, e.g., stamped from metal or other heat conductive material, serves to support the panel 70 and tubing 74 spaced above the base 78 of housing 16. The sheet 84 also creates a gas passageway 86 below the panel 70 and the housing base 78.

A gas inlet 88 extends through the housing 16 and into the gas passageway 64. A manifold 90 fitted to the exhaust end 92 of inlet 88 serves to distribute gas from inlet 88 evenly across the width of passageway 64.

Figure 2:
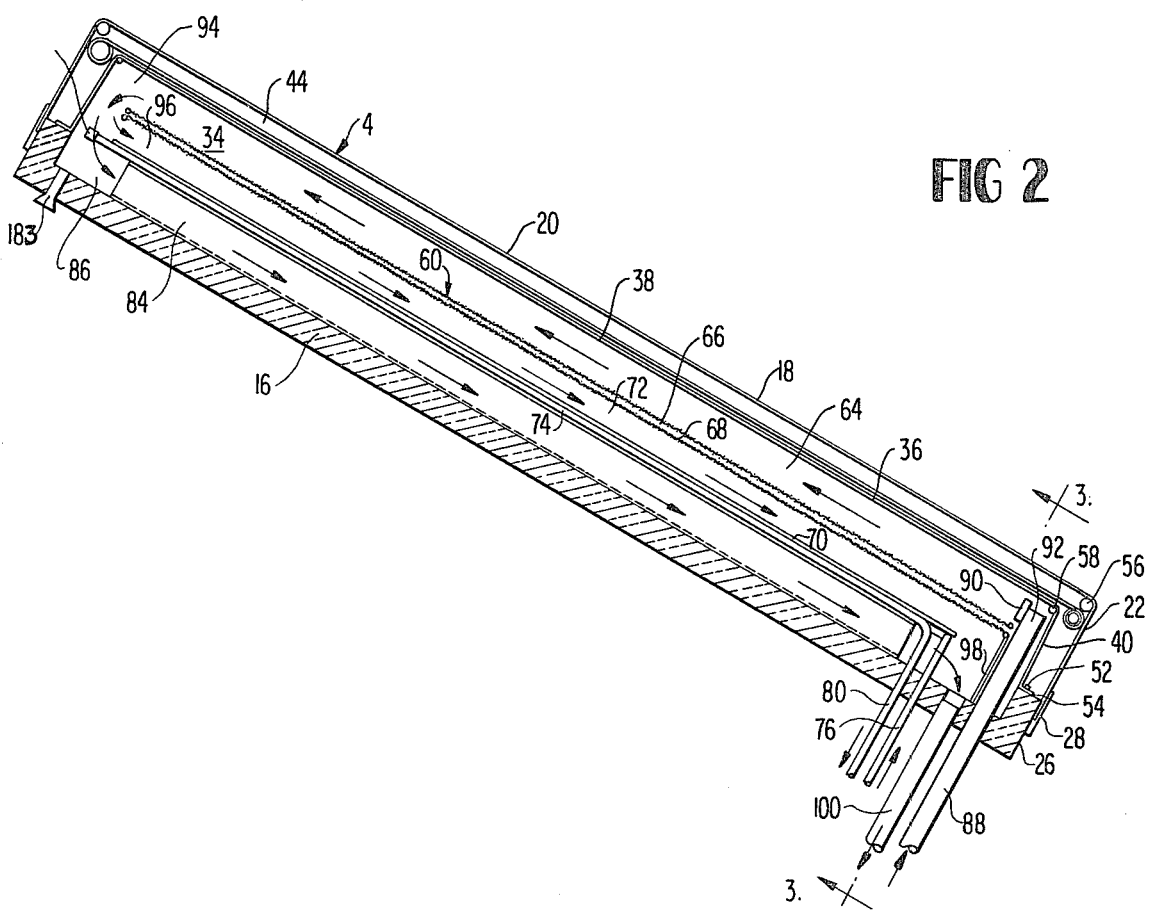
FIG. 2 is a lateral sectional view of a solar heat collector of the invention.

The downstream end 94 of passageway 64 joins the upstream end 96 of passageway 72 so gas flows, as indicated by the arrows in FIG. 2, from inlet 88 along passageway 64 and then passageway 72 until baffle 98 directs it into the gas outlet 100 which extends through the housing 16. Gas also flows from gas passageway 64 through passageway 86 below the panel 70 to exit through the gas outlet 100.

Although the gas flow as described above is preferred, other arrangements may be used. For example, the forced gas may enter the top and return to the top of the collector or from the bottom and return to the bottom, or from the right or left side and return to the same or other side. In any of these arrangements, the gas stream after being heated in the collector means 2 can be conveyed by conduit means 8 to the heat exchange means 14 and recycled to the collector means 2 and/or conveyed to storage (not shown). The conduit means 8 can comprise exhaust pipe 102, return pipe 104 and gas blower 106.

The liquid conduit means 10 comprises a line 108 leading from a liquid source and a pump 110 that delivers liquid under pressure to the liquid inlet 76. The liquid outlet line 80 leads to the storage means 12 comprising small, insulated storage tank 110, intermediate size tank 112 and large size tank 114. The inlet pipes 116, 118 and 120 to tanks 110, 112 and 114 respectively, include control valves 122. Similarly, the exit lines 124, 126 and 128 from tanks 110, 112 and 114 respectively, include control valves 130, and connect to a common line 132.

The liquid supplied through line 108 may be water, water containing antifreeze, brine or any other suitable liquid. It may be derived from a primary source (not shown) such as a water main or may be the whole or any part of the liquid which flows out of storage means 12 via line 132.

Two tanks, e.g., 110 and 114, may be used or, alternatively, more than three tanks may be used. Regardless of number, the tanks should be heat insulated and advantageously placed under ground. Also they are graduated in size. As the temperature of liquid in the storage tank 110 reaches a predetermined level, e.g., 180°-200° F., differential thermostats (not shown) controlling valves 122 will operate to switch liquid flow from line 80 from tank 110 to tank 112 and then from 112 to 114. Liquid is pumped from tank 110 last, i.e., if all tanks are at the same predetermined temperature, use of heated liquid will begin from the largest tank 114 until its temperature drops to a predetermined level, e.g., 175° F. Then, a differential thermostat will operate control valve 130 of tank 114 to cut off flow from tank 114 and starts flow from tank 112, etc.

The rate of flow of liquid into the collector 4 via line 76 is controlled by thermostatic means 134 which comprises a throttle valve 136 regulated by a thermostat (not shown) which may be attached to panel 70 or inserted in tubing 74. Also, the rate of flow of gas into the collector 4 via line 88 is controlled by thermostatic means 138 which comprises a throttle valve 140 regulated by a thermostat (not shown) which may be positioned in the passageway 64 or other desired position in chamber 34.

The amount of heat, i.e., BTUs, absorbed by the gas and liquid flowing in the collector 4 from the sun rays is in direct relation to the exposure time (distance travelled in collector/flow rate). The temperature of liquid and gas is controlled, in part, by controlling the flow rate. To obtain the maximum amount of heat, the new collection methods automatically increase or decrease the flow rates thermostatically. The gas flow rate may be controlled by thermostatically increasing or decreasing the speed of the gas blower 106 or by controlled opening or closing of the throttle valve 140. The liquid flow rate may be controlled by thermostatically increasing or decreasing the speed of the pump 100 or by controlled opening and closing thermostatically the throttle valve 136. The thermostatic sensors (not shown) that form part of the thermostatic means 134 and 148 may be located at any suitable place in the collector 4 or in the conduit means 10 and 8 respectively.

The collector 4 is provided with shutter means 142 to shade the chamber 34 and the various elements contained therein for sun rays. The shutter means is automatically operated by latch means 144 in response to the temperature that may exist in chamber 34. For example, the shutter means automatically shuts off sunlight to the screen means 60 in case of an electrical power failure that would stop the running of pump 110 and blower 106. When the pump or the blower is off, during a clear or a high sun ray absorption time, the sun collector temperature can raise to 400° F. or more, when there is no liquid or gas flow through the sun collector system. If temperature raises about the setting or the pressure relief valve 82, the valve will open—this will allow the liquid in the tube system to escape. If antifreeze or a refrigerant is used in the liquid system, it will require replacement at an added expense or material and labor, when liquid is released by the relief valve.

The shutter means 142 is in between the transparent covers 18 and 36, closing over the cover 36 to prevent a high temperature buildup. Also, thermostatically, the blower and pump will be turned off when the temperature is in the sun collector drops below a predetermined temperature and, would also be turned on at a predetermined raise in temperature. This low temperature turn off will close the shutter means 142 over the inner cover 36 which helps to keep in the heat already in the collector.

The shutter means 142 comprises a roller 146 carried in bearing 148 biased by an internal spring (not shown) to rotate so as to wind the cords or cables 150 onto the roller 146. The cables 150 are connected at the unwound end to the flexible, opaque web 152 which rolls around the roller 154 carried by bearing 156. The web is made of cloth, non-woven fabric or the like and preferably has light reflective surfaces. The roller 154 is rotated by the motor 158 and reduction drive 160.

The latch means 144 is advantageously a magnetic brake which is turned on by a limit switch (not shown) that turns off motor 158 when the shutter web 152 is fully wound onto the roller 154. The energized brake 144 holds the roller and web from unwinding, but if there is a power failure, the brake will be de-energized and allow the roller 154 to move so cable 150 will wind onto roller 146 and draw web 152 across the collector to roller 146 shutting off sun rays from entering the collector. This interior roll-up type of shutter means is advantageously used to protect the collector against overheating.

The reflector means 6 comprises a quadrangular sheet 162 having dependent side portions 164. It is pivoted at one end upon spring-biased hinges 166 that urge reflector means 6 toward a closed position covering the collector (see FIG. 3). The reflector means 6 is moved into the open position (see FIG. 1) where it will reflect sun rays into the collector 4 by cable 168 which is fastened at end 170 to sheet 162. The cable 168 passes over the pulley 172 to the motor drive 174.

Sun rays are enhanced up to 40 percent by using the reflective means 6. The panel is attached to bottom of collector housing by a spring loaded hinge 166 set at an open angle of about 110° between collector housing surface and the reflective panel. The sun rays are bounced or reflected from the reflective means 6 through the transparent cover of collector at the same time that the sun rays are received directly through the transparent covers to obtain the maximum energy yield. The hinged reflective means 6 has a spring attached to hinges 166 which holds the hinge in a normal closed position. The closed position covers up the transparent cover on the collector if electrical power should fail. If reception was high, means 6 can also prevent damage to the collector from overheating. The reflective means 6 can close up when heat reception is too low (using a preset temperature remote control thermostat (not shown) that opens the circuit to magnetic brake 176 which holds the reflective panel in down (open) position. This allows the spring tension to raise panel, closing the front of collector, also, turning off the fluid pump and gas blower.

Closing the face of the collector helps to retain the heat which is in the collector and housing unit. The spring pressure in hinges 166 will close and hold the means 6 closed when power is off. When electrical power comes back on, or temperature in the collector is above a predetermined setting, the reflective panel is pulled down to its normal open position by the flexible cables 168 which are rolled up by the small electrical motor unit 174. When the reflective means reaches a predetermined down (or open) position, the sheet 162 operates the limit switch 178. In the reflection position, the switch 178 turns off the electrical motor and turns on the magnetic brake, holding sheet 162 down (open).

The collector 4 is pivoted at one side upon the standard 180 and adjustable support means 182 is connected to the housing 16 to permit the collector the be fixed at varied angles about the standard 180 relative to the horizon.

A pressure relief valve 183 may be fitted in the housing 16 to prevent damage to the collector 4 due to excessive gas pressure build-up in the chamber 34.

Gas is heated by the sun rays coming in through the two transparent covers 18 and 36, then passing over screens 66 and 68 heating the gas twice, once when the gas is forced over the upper screen and, when it returns behind bottom screen. The gas also flows in front of and in back of collector panel 70 with liquid tubes attached. The sun rays pass through the screens and are absorbed by the panel 70 in back of screens with liquid tubes attached; thus, heating both gas and liquid at the same time.

The two screens 66 and 68 are close together and both have an open space at the same end. The top screen is treated as previously stated, with a heat absorbing coating on both sides. The bottom screen is treated with the same heat absorbing coating, only on the top side of the bottom screen. The under side of the bottom screen is reflective, to help hold the heat rays inward that have been received from the sun for greater heat absorption. It is necessary to maintain an average temperature between 170° F. and 200° F. to furnish the required heat for a heat absorption air-conditioning system.

As can be seen by reference to FIGS. 2 and 3, the level of the screen means 60 and the panel 70 is above the top surface of ledge portion 48 of housing 16. This brings them on a level with transparent sides 24 and 42, etc. of the transparent covers 18 and 36 so the means 60 and panel 70 will obtain maximum exposure to sun rays, i.e., shadowing of them by housing 16 early and late in the day is eliminated.

The heated gas can be used to heat liquid by passing the heated gas through a heat exchanger. Also, the heated liquid can be used to heat gas by passing the heated liquid through a heat exchanger; thus, supplying the maximum amount of heated gas or heated liquid which different systems may require.

Where air-conditioning is needed, more than space heating, more heated liquid will be required. When the need for space heating is greater, either gas heating or liquid heating can be used for the space heating. It is also possible to use both heated gas and heated liquid for space heating, air-conditioning and hot water at the same time.

The embodiments of the invention in which an exclusive property or privilege is claimed are defined as follows:

1. A solar energy collection method which comprises:
    exposing a screen to rays of the sun passing through a transparent sheet spaced apart from said screen forming a first longitudinal passageway therebetween, exposing an opaque panel of heat conductive material spaced apart from and substantially parallel to said screen forming a second longitudinal passageway therebetween to rays of the sun passing through said screen, passing a stream of gas through said first passageway, then through said second passageway, next passing the resulting heated gas through a heat exchanger external of said passageways and recycling at least a portion of said air to said first passageway, thermostatically controlling the rate of circulation of said gas stream, passing a stream of liquid in heat exchange relationship with said panel, then passing said liquid stream to a storage chamber external of said panel and recycling at least a portion of said liquid back into heat exchange with said panel, and thermostatically controlling the rate of circulation of said liquid.

2. The method of claim 1 wherein an opaque web is automatically interposed between the sun and said transparent sheet when the temperature of said gas stream raises above or falls below a predetermined temperature range.

3. The method of claim 1 wherein a portion of said gas stream is passed in contact with the shadow side of said panel.

4. The method of claim 1 wherein said screen is exposed to sun rays radiated directly from the sun and is simultaneously exposed to sun rays reflected from a reflector positioned adjacent to said screen and panel.

5. A solar energy collector system comprising:
a quadrangular housing,
a first transparent cover forming a substantially gas-tight chamber over said housing,
a second transparent cover within said chamber spaced apart and substantially parallel to said first cover,
flat screen means positioned within said chamber substantially parallel to said second cover on the side thereof opposite to said first cover, said screen means being spaced apart from said second cover forming a first longitudinal passageway therebetween,
an opaque panel of heat conductive material positioned within said chamber substantially parallel to said screen means spaced apart therefrom on the side opposite to said second cover forming a second longitudinal passageway between said screen and said panel,
an inlet through said housing for flow of gas into said first passageway,
an outlet through said housing for flow of gas out of said second passageway,
said first and second passageways being joined at one end thereof for flow of gas from one of said passageways to the other, means to circulate liquid into said housing, then into heat exchange relationship with said panel and out of said housing,
thermostatic means to control rate of flow of gas into said inlet, and
thermostatic means to control rate of said liquid circulation.

6. The solar energy collector system of claim 5 which additionally comprises:
shutter means designed to move between said first and second transparent covers to shade said screen means, passageways and panel from sun rays radiating on said collector, and
means automatically to operate said shutter means dependent upon the temperature existing in said chamber.

7. The solar energy collector system of claim 6 wherein said shutter means comprises:
a spring biased roller carried within said chamber along on a side thereof and between said first and second covers,
a second roller carried within said chamber between said first and second covers on the side of the chamber opposite to said spring biased roller,
motor means to rotate said second roller,
a flexible, opaque web wound around said second roller,
cable means connected to said web and to said spring biased roller to be wound thereon and pull said web to said roller, and
latch means to prevent rotation of said second roller.

8. The solar energy collector system of claim 5 wherein said housing is pivoted at one side thereof and adjustable support means is connected to the housing to permit the housing to be fixed at varied angles about said pivot relative to the horizon.

9. The solar energy collector of claim 8 which has a quadrangular reflector hinged at one side to the side of said housing that is pivoted that enables the reflector to move from a position to reflect sun rays on to said first cover to a position covering said first cover.

10. The solar energy collector system of claim 9 wherein said hinge includes spring means urging said reflector to move to said covering position and there is cable means carried by said housing to move said reflector against the bias of said spring means into said reflecting position.

11. The solar energy collector system of claim 5 wherein said screen means comprises a parallel pair of metal screens, the surface of the screen most distant from said second cover that faces said panel being light reflective and the other surfaces of said screens being light absorptive.

12. The solar energy collector system of claim 5 which comprises a plurality of insulated liquid holding tanks, conduit means to convey liquid from said tanks to said housing and from said housing to said tanks, pump means to circulate liquid through said conduit means, valve means to relieve excess liquid pressure in said conduit means and valve means to relieve excess gas pressure within said chamber.

* * * * *